United States Patent [19]
Rohloff et al.

[11] Patent Number: 6,089,532
[45] Date of Patent: Jul. 18, 2000

[54] VALVE FOR USE WITH AGRICULTURAL SPRAYERS

[75] Inventors: Terry Lynn Rohloff, Eagan; Timothy L. Sebion, Lakeville; Frederick Allan Powers, Maple Grove, all of Minn.

[73] Assignee: Wanner Engineering, Inc., Minneapolis, Minn.

[21] Appl. No.: 09/022,577

[22] Filed: Feb. 12, 1998

[51] Int. Cl.[7] .................................................. F16K 31/126
[52] U.S. Cl. ......................................... 251/61.4; 251/61.2
[58] Field of Search ................................. 251/61.4, 61.2, 251/61.1, 61, 331, 25, 335.2

[56] References Cited

U.S. PATENT DOCUMENTS

| | | | |
|---|---|---|---|
| 2,989,282 | 6/1961 | White | 251/61.1 |
| 3,559,945 | 2/1971 | Coiner et al. | 251/61.2 |
| 3,618,891 | 11/1971 | Topfer | 251/61.2 |
| 3,689,025 | 9/1972 | Kiser | 251/61.4 X |
| 3,767,159 | 10/1973 | Treul | 251/61.2 |
| 3,897,041 | 7/1975 | Cowan | 251/61.2 X |
| 4,376,444 | 3/1983 | Michael | 251/61.2 X |
| 5,529,280 | 6/1996 | Satoh et al. | 251/61.1 |

OTHER PUBLICATIONS

Air Stop Brochure; KZCO, Inc.
Exhibit 1; photograph of Ag–Chem Equipment Company Valve.
Exhibit 2; photograph of Sprang Systems Valve.

*Primary Examiner*—Kevin Lee
*Attorney, Agent, or Firm*—Merchant & Gould P.C.

[57] ABSTRACT

The present disclosure relates to a valve including a valve body defining an inlet port and an outlet port. The valve also includes a first diaphragm arranged and configured for opening and closing a fluid flow path between the inlet and outlet ports. The valve further includes a second diaphragm cooperating with the first diaphragm to enclose a chamber formed within the valve body. The valve is closed by applying an actuating pressure to an exterior side of the second diaphragm such that the second diaphragm mechanically causes the first diaphragm to close the fluid flow path between the inlet and outlet port.

31 Claims, 5 Drawing Sheets

VALVE FOR USE WITH AGRICULTURAL SPRAYERS

FIELD OF THE INVENTION

The present invention relates generally to the field of valves. More particularly, the present invention relates to diaphragm valves for use with agricultural sprayers.

BACKGROUND

It is a common agricultural practice to use large mobile spraying equipment to rapidly and efficiently spray fields with various products such as herbicides, pesticides and fertilizers. Such spraying equipment often includes a mobile unit such as a tractor equipped with a large tank for carrying the chemicals desired to be sprayed. The chemicals are typically pumped from the tank through flow lines to a plurality of spray nozzles that are typically mounted on an elongated boom structure pulled behind the mobile vehicle. Flow through the spray nozzles is typically controlled by mechanical spring valves that stop flow to the spray nozzles when the pressure in the flow lines falls below a predetermined level.

A problem with such mechanical spring valves is that they typically do not have the capability of instantaneously stopping and starting a uniform discharge through the spray nozzles. This lack of control is particularly problematic at the ends of fields where spraying must be temporarily stopped and restarted as the spraying equipment turns to make subsequent passes across the field. To overcome the lack of control provided by conventional spring valves, attempts have been made to utilize pneumatically actuated valves for controlling flow through the spray nozzles. Two different types of pneumatic valves have been utilized: normally open; and normally closed. A normally open valve uses a heavy spring to hold the valve open, and relies on air pressure to push the valve closed. By contrast, a normally closed valve uses a heavy spring to hold the valve closed, and relies on air pressure to open the valve.

A variety of problems exist with respect to the above identified valves. For example, one problem relates to such valves' dependence upon a source of compressed air such as an air compressor. If the air compressor fails, a normally open valve will have no way of preventing the undesirable leakage of chemicals from the spraying equipment. By contrast, if the air compressor fails in a system utilizing normally closed valves, the spraying equipment is completely inoperative.

In addition to the above problems, known valve arrangements typically have a sealed piston that slides within the valve. Typically, displacement areas within the valve are vented to the outside atmosphere to eliminate the compression of gasses within the valve as the piston moves. In dusty environments such as those encountered by agricultural sprayers, a valve that vents to atmosphere rapidly becomes contaminated with dirt. Such dirt both damages the piston seals and increases friction within the valve. Also, the pistons are commonly lubricated with grease that rapidly entraps field dust and further intensifies the problem of contamination induced friction and wear.

SUMMARY OF THE INVENTION

One possible embodiment of the present invention relates to a valve including a valve body defining an inlet port and an outlet port. The valve also includes a first diaphragm arranged and configured for opening and closing a fluid flow path between the inlet and outlet ports. The valve further includes a second diaphragm cooperating with the first diaphragm to enclose a chamber formed within the valve body. The valve is closed by applying an actuating pressure to an exterior side of the second diaphragm such that the first diaphragm is caused to close the fluid flow path between the inlet and outlet ports. In one particular embodiment, a piston structure is positioned within the chamber between the first and second diaphragms such that when the actuating pressure is applied to the second diaphragm, the second diaphragm forces the piston structure against the first diaphragm causing the first diaphragm to close the valve.

The above-described embodiment provides numerous advantages over the prior art valves identified in the background. For example, the two diaphragm configuration eliminates the need for internal sliding pistons thereby reducing or minimizing friction within the valve and eliminating the need for lubrication. Also, unlike conventional normally open valves, the embodiment does not require a spring for holding the valve open. Consequently, a large percentage of the closing force provided by the actuating pressure can be transferred to the first diaphragm because there is no substantial spring resistance that needs to be overcome. Additionally, the embodiment does not need its displacement area to be vented to atmosphere. Hence, wear of the valve is reduced because dust and other contaminants prevalent in farming environments are not drawn into the valve. Furthermore, the valve is relatively easy to assemble and manufacture.

Another possible embodiment of the present invention relates to a valve including a sealing element moveable between a first position in which a fluid flow path between inlet and outlet ports of the valve is open, and a second position in which the fluid flow path between the inlet and outlet ports is closed. The valve also includes a first valve closing structure arranged and configured to move the sealing element to the second position when an actuating pressure is supplied to the first valve closing structure by a source of fluid pressure. The valve further includes a second valve closing structure arranged and configured to resiliently bias the sealing element toward the second position.

The above-described embodiment also provides advantages over the prior art valves identified in the background. For example, the second valve closing structure can function as a mechanical "back-up" for closing the valve even if the source of fluid pressure, such as an air compressor, becomes inoperative. Consequently, if a fluid pressure failure occurs, the valve continues to operate thereby allowing a user of the valve to continue operations such as agricultural spraying.

A variety of additional advantages of the invention will be set forth in part in the description that follows and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. A brief description of the drawings is as follows.

DETAILED DESCRIPTION

The following description provides details concerning certain embodiments constructed in accordance with the principles of the present invention. It will be appreciated that the described embodiments are but a few of many possible embodiments that can incorporate or utilize certain broad inventive aspects of the present invention. One such broad aspect relates to a valve that is not vented to atmosphere. Another broad aspect relates to a valve having minimal internal friction. An additional broad aspect relates to a valve having an actuating diaphragm that cooperates with a sealing diaphragm to open and close the valve. A further broad aspect relates to a valve having structure for pneumatically or hydraulically closing the valve, and a "back-up" structure for resiliently or mechanically closing the valve. The broad aspects specified above are several of many inventive aspects that will be apparent from the following detailed description.

Reference will now be made in detail to exemplary embodiments of the present invention which are illustrated in the accompanying drawings. Wherever possible, the same reference numbers will be used throughout the drawings to refer to the same or like parts.

Figure 1:
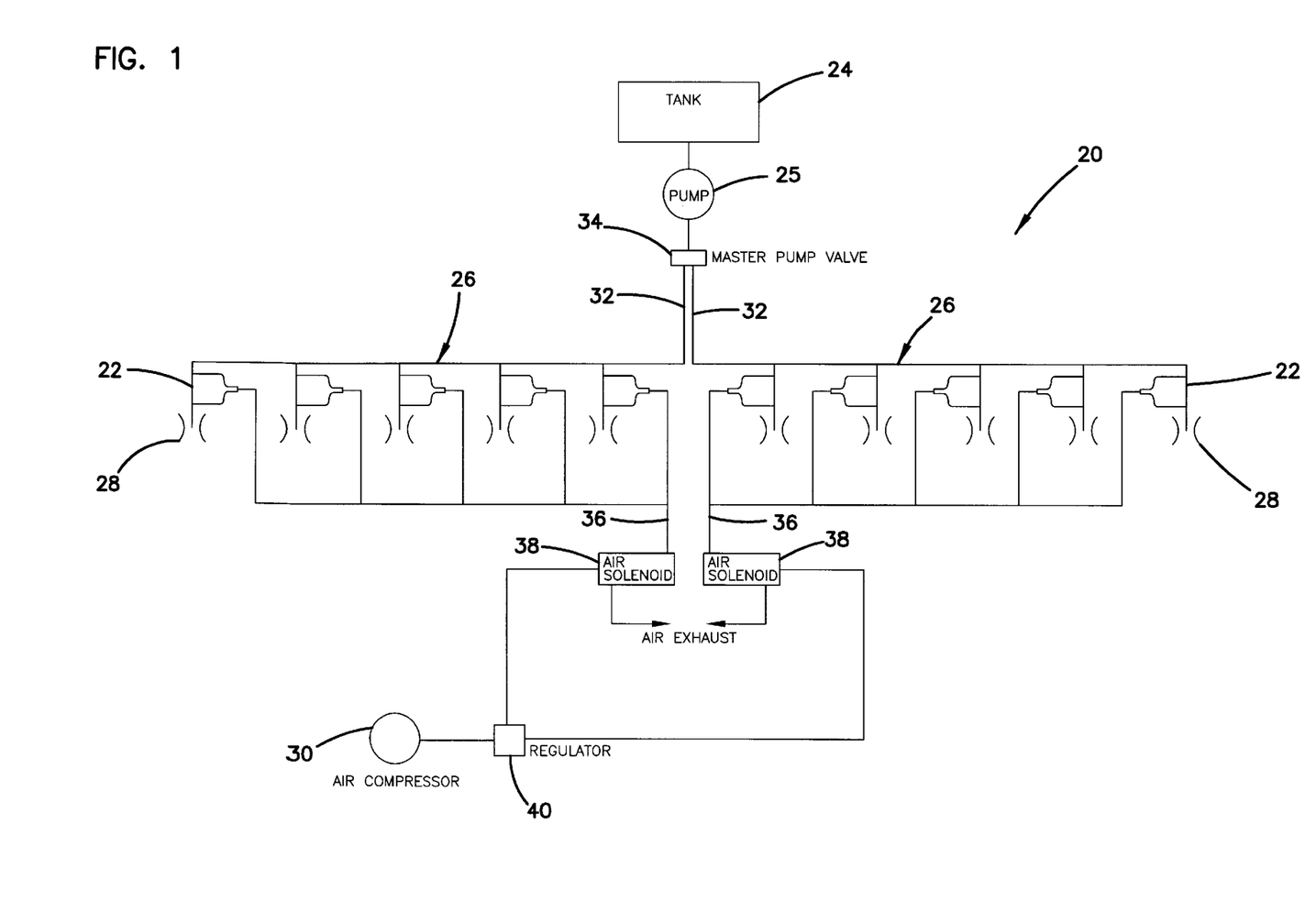
FIG. 1 is a schematic drawing of an agricultural spraying configuration incorporating valves constructed in accordance with the principles of the present invention.

FIG. 1 is a schematic illustration of a agricultural spraying arrangement 20 incorporating valves 22 constructed in accordance with the principles of the present invention. Generally, the spraying arrangement 20 includes a tank 24, a pump 25, a boom structure 26 having a plurality of spray nozzles 28, and a source of compressed fluid such as an air compressor 30. The tank 24 typically contains agricultural chemicals such as herbicides, pesticides and fertilizers that are pumped through a pair of flow lines 32 to the nozzles 28. Flow through the individual flow lines 32 is controlled by a master pump valve 34, while flow through the individual nozzles 28 is controlled by the valves 22. The valves 22 are selectively pneumatically closed through the use of air pressure provided by the air compressor 30. The compressed air is directed to the valves 22 through a pair of flow lines 36 typically made of hosing, piping, tubing or other type of conduit suitable for conveying fluid. A pair of air solenoids 38 control flow through the flow lines 36, while the air pressure provided by the air compressor 30 is controlled by a regulator 40.

In use, the spraying arrangement 20 is typically coupled to a vehicle, such as a tractor, adapted for pulling the spraying arrangement 20 across a farm field. As the spraying arrangement 20 is pulled across the farm field, the nozzles 28 deliver a controlled amount of chemicals to the soil. When the tractor reaches the end of the field, the valves 22 are pneumatically closed thereby stopping flow through the nozzles 28 while the tractor turns around for another pass across the field. Because the valves 22 are pneumatically actuated, flow through the nozzles 28 can be stopped almost instantaneously. Also, because the valves are located directly adjacent to the nozzles 28, constant pressure is maintained in the flow lines 32 even when the valves 22 are closed. Hence, after the tractor turns around and the valves 22 are re-opened, a desired uniform spraying concentration/rate can almost instantaneous be achieved at each of the nozzles 28.

Figure 2:
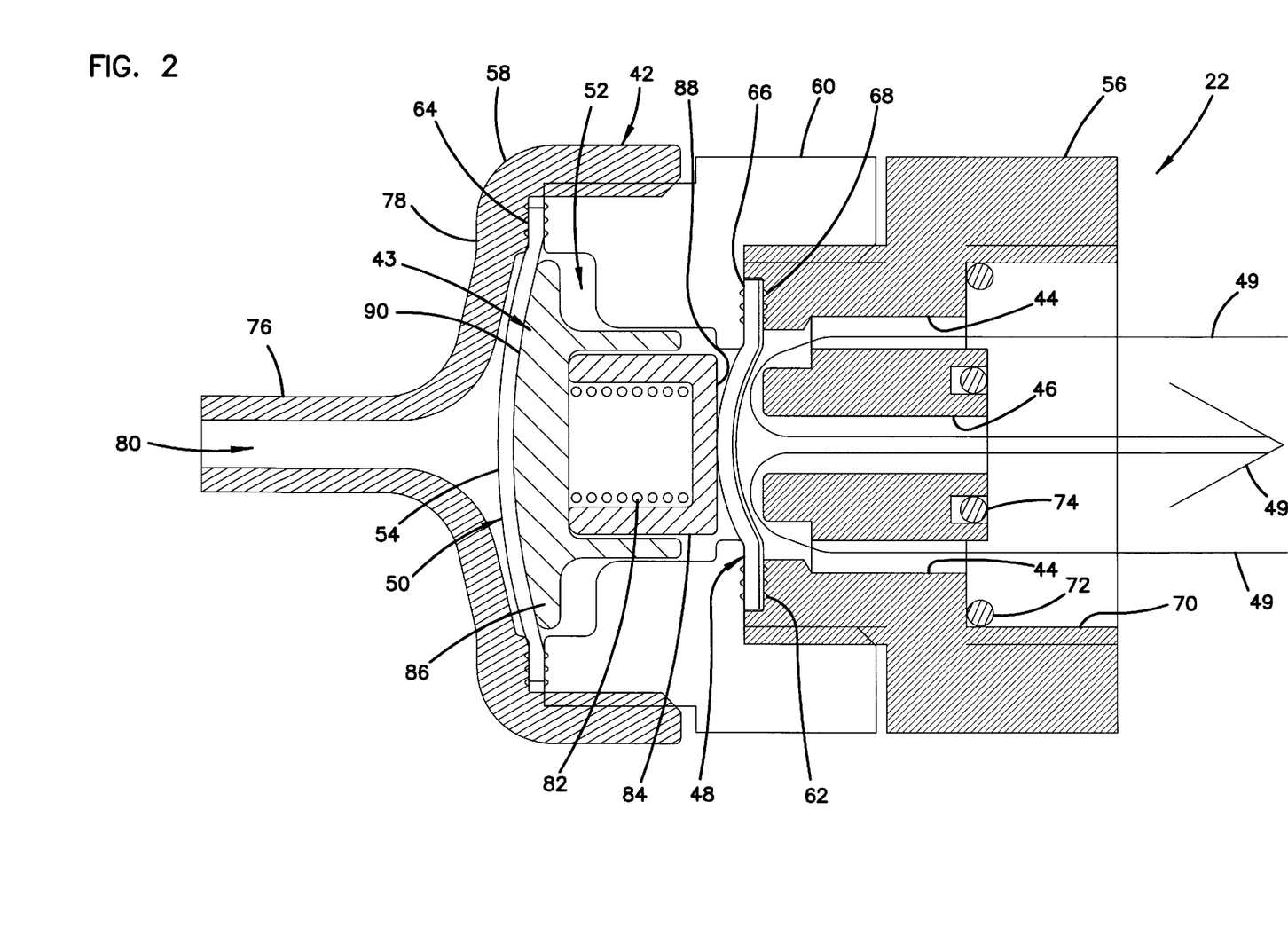
FIG. 2 is a cross-sectional view of a valve constructed in accordance with the principles of the present invention, the valve is shown in an open position.
Figure 3:
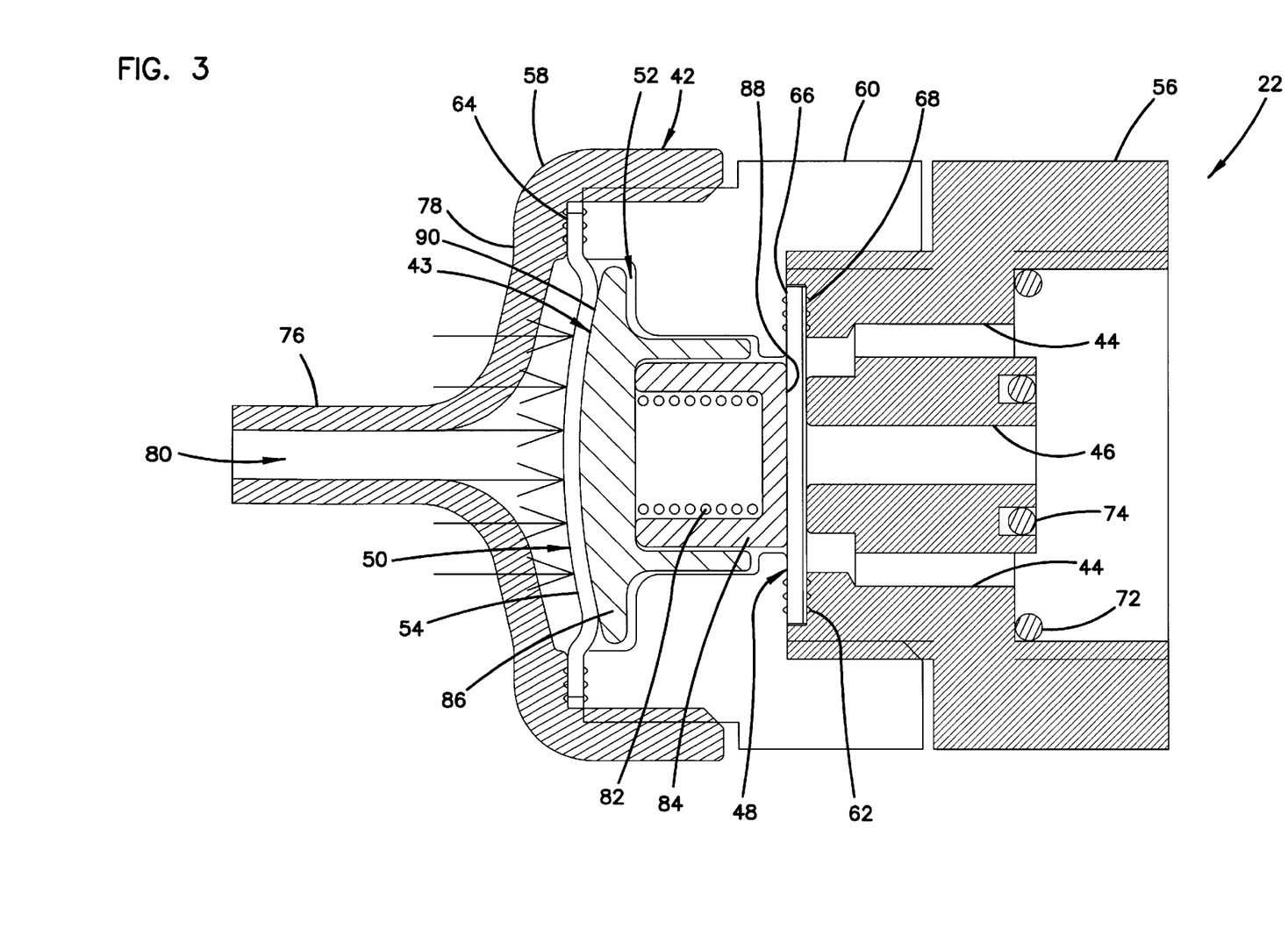
FIG. 3 is a cross-sectional view of the valve of FIG. 2, the valve is shown in a pneumatically closed position.
Figure 4:
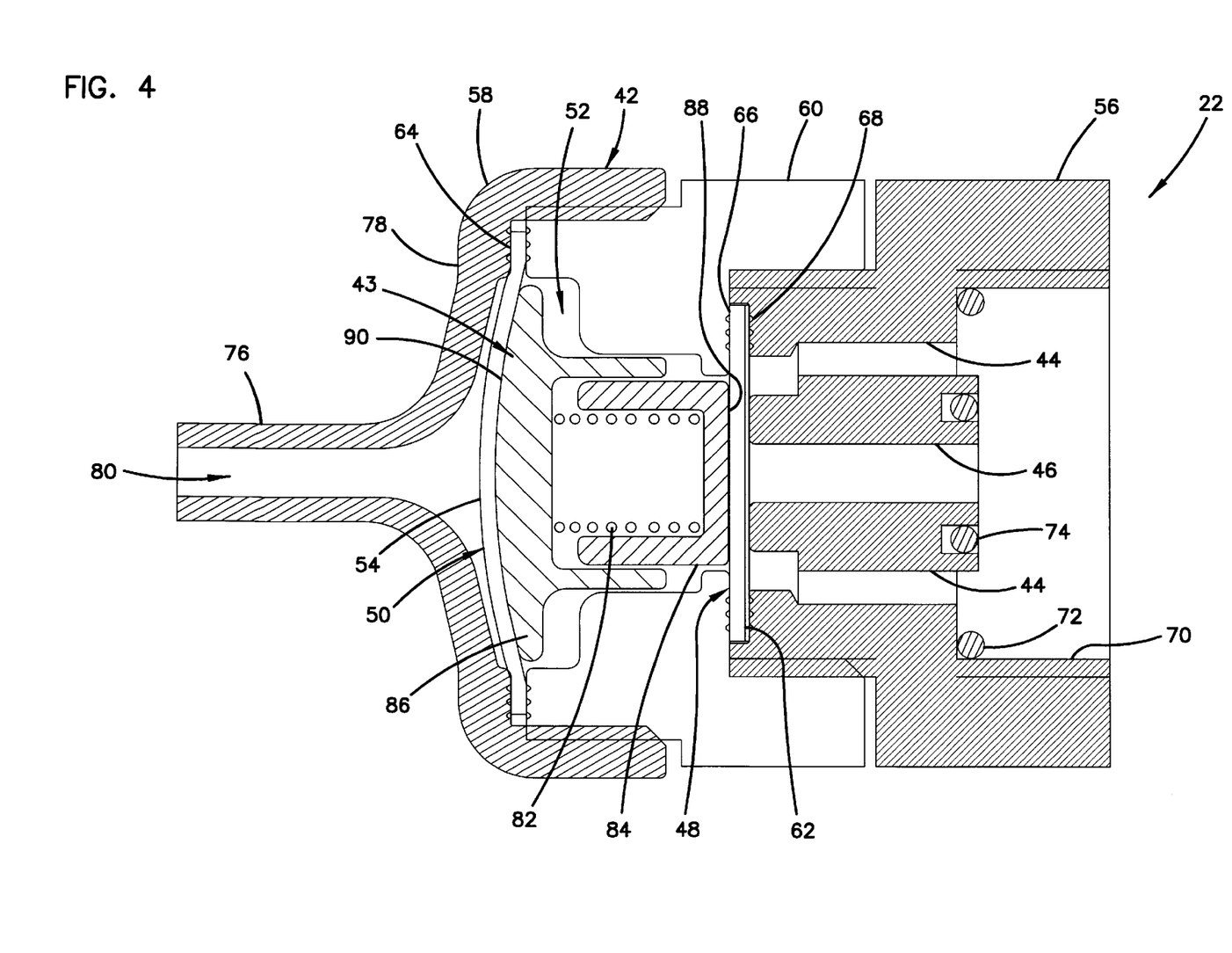
FIG. 4 is a cross-sectional view of the valve of FIG. 2, the valve is shown in a mechanically closed position.

FIGS. 2–4 are cross-sectional views taken lengthwise through one of the valves 22. Generally, the valve 22 includes a valve body 42 defining an inlet port 44 and an outlet port 46. The valve 22 also includes a first diaphragm 48 moveable between a first position in which a fluid flow path 49 between the inlet and outlet ports 44 and 46 is open (shown in FIG. 2), and a second position in which the fluid flow path 49 between the inlet and outlet ports 44 and 46 is closed (shown in FIG. 3). The valve 22 also includes a second diaphragm 50 cooperating with the first diaphragm 48 to enclose a sealed chamber 52 formed within the valve body 42. A piston structure 43 is positioned within the chamber 52 between the first and second diaphragms 48 and 50. When an actuating pressure is applied to an exterior side 54 of the second diaphragm 50, the second diaphragm 50 drives the piston structure 43 against the first diaphragm 48 causing the first diaphragm 48 to be mechanically moved such that the fluid flow path 49 between the inlet and outlet ports 44 and 46 is closed.

The valve body 42 of the valve 22 includes a first end piece 56, a second end piece 58 and an intermediate piece 60 positioned between the first and second end pieces 56 and 58. The first end piece 56, the second end piece 58 and the intermediate piece 60 are threaded together. More specifically, the first end piece 56 is threaded within the intermediate piece 60, and the intermediate piece 60 is threaded within the second end piece 58. The first diaphragm 48 is positioned between the first end piece 56 and the intermediate piece 60, and the second diaphragm 50 is positioned between the second end piece 58 and the intermediate piece 60. More particularly, a peripheral or circumferential portion 62 of the first diaphragm 48 is clamped between the first end piece 56 and the intermediate piece 60 to form an annular static seal between the pieces. Similarly, a peripheral or circumferential portion 64 of the second diaphragm 50 is clamped between the second end piece 58 and the intermediate piece 60 to form an annular static seal between the pieces.

The intermediate piece 60 of the valve body 42 is generally cylindrical or tubular and defines the chamber 52 of the valve 22. Opposite ends of the chamber 52 are enclosed and sealed by the first and second diaphragms 48 and 50. The diaphragms 48 and 50 are generally thin-cylinder or disk-shaped and are preferably made of a resilient or flexible material such as polyurethane, neoprene, buna, viton, or other rubber or plastic materials. The diaphragms 48 and 50 can also be made of multiple layers of different materials to achieve desired flexibility characteristics. For example, in one particular embodiment, the first diaphragm 48 includes an inner layer 66 made of polyurethane and an outer layer 68 made of ultra high molecular weight polyethylene. Other illustrative materials suitable for forming the outer layer 66 include PTFE and polypropylene. Although the outer diaphragm 68 is shown having two layers, it will be appreciated that the diaphragm could also have one layer or more than two layers depending upon the flexibility characteristics of the particular materials employed.

The first end piece 56 of the valve body 42 defines the inlet and outlet ports 44 and 46. The outlet port 46 is formed by a centrally located first opening that extends axially through the first end piece 56. The inlet port 48 is formed by an annular second axial opening defined by the first end piece 56 that is radially offset from and co-axially aligned with the first axial opening. Although the inlet port 48 is shown as an outer opening and the outlet port 46 is shown as an inner opening, it will be appreciated that fluid can also be pumped through the valve in the reverse direction such that the inlet and outlet openings are reversed. The determination of whether a particular port is an inlet or outlet port is dependent upon the flow arrangement of the structure to which the valve is coupled.

The first end piece 56 also includes an internally threaded female portion 70 adapted for connection to a corresponding threaded male piece of a fluid connector. Such a fluid connector would typically be associated with fluid conduit such as the flow lines 32 of the spraying arrangement 20. An outer annular seal or O-ring 72 is positioned within the female portion 70 to prevent leakage between the valve 22 and a fluid connector threaded within the female portion 70. An inner annular seal or O-ring 74 is also positioned within the female portion 70 to prevent cross-flow between the inlet and outlet ports 44 and 46 when a fluid connector is threaded within the female portion 70.

The second end piece 58 of the valve body 42 is adapted for connection to a source of fluid pressure, such as the air compressor 30, for supplying the actuating pressure to the second diaphragm 50. As shown in FIGS. 2–4, the second end piece 58 includes an elongated tubular portion 76 and a flared portion 78. The tubular portion 76 and the flared portion 78 cooperate to define a fluid or air passage 80 in fluid communication with the exterior side 54 of the second diaphragm 50. The air passage 80 has a relatively small cross-sectional area along the tubular portion 76 and has a relatively large cross-sectional area adjacent the second diaphragm 50. Typically, the source of fluid pressure is connected to the valve 22 by means such as flexible tubing that is inserted over the tubular portion 76 of the second end piece 58.

Referring back to FIGS. 2–4, the first and second diaphragms 48 and 50 are generally coaxially aligned. The second diaphragm 50 preferably has a larger surface area than the first diaphragm 48. More preferably the second diaphragm 50 has a surface area two or three times as large as the surface area of the first diaphragm 48. By increasing the diameter of the second diaphragm 50 relative to the first diaphragm 48, the sealing pressure applied by the first diaphragm 48 is increased relative to the actuation pressure applied to the second diaphragm 50. For example, if the surface area of the second diaphragm 50 is three times as large as the surface area of the first diaphragm 48, a 50 pound per square inch (psi) pressure applied to the second diaphragm 50 generates a sealing pressure of roughly 150 psi at the first diaphragm 48. The ability to generate a sealing pressure that is greater than the actuation pressure applied to the second diaphragm 50 is significant because air compressors commonly have pressure limits slightly above 100 psi, and it is foreseeable that spraying pressures may exceed 100 psi in the future.

The valve 22 of FIGS. 2–4 also includes an optional spring structure 82 arranged and configured to bias the first diaphragm 48 toward a position in which the fluid flow path 49 between the inlet and outlet ports 44 and 46 is closed. As shown in FIGS. 2–4, the spring structure 82 is a coil spring mounted within the chamber 52 between the first and second diaphragms 48 and 50. However, it will be appreciated that the term "spring structure" also includes other structures exhibiting spring-like characteristics such as elastomeric structures, elastic structures, and resilient structures.

The spring structure 82 is adapted to function as a mechanical back-up for closing the valve 22 if the source of actuating pressure becomes inoperative. FIG. 4 shows the valve 22 with only the spring structure 82 holding the first diaphragm 48 in the closed position. The spring structure 82 does not need a high force to close fluid flow path 49 since the spring need only overcome the elastic memory of the first diaphragm 48. In one particular embodiment, the spring structure 82 generates a sealing pressure of about 5 psi. This relatively low spring force allows the fluid flow path 49 to be forced open at relatively low pressures, but prevents dripping, drainage or other flow through the valve 22 when the pressure along the fluid flow line 49 falls below the sealing pressure applied by the spring structure 82. Consequently, when used in association with an agricultural sprayer, an operator can continue spraying even if the operator's actuating pressure source fails.

The piston structure 43 can include one or more pieces or members mounted within the chamber 52 and adapted for transferring a closing force from the second diaphragm 50 to the first diaphragm 48. The piston structure 43 is preferably adapted for telescopic movement within the valve body 42. As shown in FIGS. 2–4, the pistons structure 43 includes a first end cap 84 and a second end cap 86. The spring structure 82 of the valve 22 has one end mounted in a recess defined by the first end cap 84 and the other end mounted in a recess defined by the second end cap 86. The first end cap 84 includes a substantially flat end 88 that engages an interior surface of the first diaphragm 48, while the second end cap 86 includes a surface 90 (preferably convex) that engages an interior surface of the second diaphragm 50. The second end cap 86 is mounted for limited telescopic movement within the intermediate piece 60 of the valve body 42, while the first end cap 84 is mounted for limited telescopic movement within the recess of the second end cap 86. The first end cap 84 has an axial length that is less that the depth of the recess defined by the second end cap 86 such that when the valve is closed, the end caps 84 and 86 contact one another.

The valve 22 is assembled by first placing the first diaphragm 48 between the first end piece 56 and the intermediate piece 60 of the valve body 42, and then threading the first end piece 56 within the intermediate piece 60 until the first diaphragm 48 is circumferentially clamped. Next, the second diaphragm 50, the second cap 86, the spring structure 82 and the first cap 84 are co-axially aligned between the second end piece 58 and the intermediate piece 60 of the valve body 42. Finally, the intermediate piece 60 is threaded into the second end piece 58 until the second diaphragm 50 is circumferentially clamped and the second cap 86, the spring structure 82 and the first cap 84 are captured within the intermediate piece 60 between the first and second diaphragms 48 and 50.

The operation of the valve 22 will now be described as it would be used in association with the spraying arrangement 20 of FIG. 1. However, it will be appreciated that the valve 22 can be used in other systems for controlling flow and is not limited to agricultural spraying systems.

As incorporated within the spraying arrangement 20, the valve 22 controls flow between one of the chemical flow lines 32 and one of the nozzles 28. Specifically, the female portion 70 of the valve 22 is connected to the chemical flow line 32 by a suitable connector. As connected, chemicals from the chemical flow line 32 are directed into the valve 22 through the inlet port 44 and exit the valve 22 through the outlet port 46. The valve 22 is also connected to the air compressor 30. Specifically, the air flow lines 36 provide fluid communication from the air compressor 30 to the tubular portion 76 of the second end piece 58. In this manner, air pressure can be selectively provided to the exterior side 54 of the second diaphragm 50 in order to pneumatically close the valve 22.

Under normal spraying conditions, the air flow lines 36 are closed by the air solenoids 38, and no actuating pressure is applied to the exterior side 54 of the second diaphragm 50. In such conditions, the pressure in the chemical flow lines 32 is sufficiently great to overcome the minimal pressure exerted on the first diaphragm 48 by the spring structure 82. Hence, the fluid flow path 49 within the valve is held open (as shown in FIG. 2) and chemicals freely flow from the chemical flow line 32, through the valve 22 to the nozzles 28.

When it is desired to stop spraying, the air flow lines 36 are opened by the air solenoids 38 causing an actuating pressure to be applied to the exterior side 54 of the second diaphragm 50 as shown in FIG. 3. The actuation pressure from the air compressor 30 causes the second diaphragm 50 to flex inward thereby causing the second end cap 86 and the first end cap 84 to mechanically move the first diaphragm 48 outward. Specifically, the second end cap 86 slides telescopically toward the first diaphragm 48 and the first end cap 84 slides telescopically within the second end cap 86 causing the spring structure 82 to be further compressed. Sufficient pressure is provided by the air compressor 30 to cause the first diaphragm 48 to be moved from the first position where the fluid flow path 49 is open (shown in FIG. 2), to the second position where the fluid flow path is closed (shown in FIG. 3). When the fluid flow path 49 is closed, the flat face 88 of the first end cap 84 is pressed firmly against the interior side of the first diaphragm 48, and the opposite end of the first end cap 84 engages the second end cap 86. By releasing the pressure applied to the exterior side 54 of the second diaphragm 50, the first diaphragm 48 is allowed to move back to the first position where the flow path 49 is open, and spraying can be resumed.

If the air compressor 30 fails, the valve 22 can no longer be pneumatically closed. However, in such a situation, the spring structure 82 allows an operator to continue spraying. Specifically, the operator can turn the spraying arrangement 20 on and off at the master pump valve 34. When the master pump valve 34 is open, pressure in the flow lines 32 is sufficiently high to push the valve 22 open against the resistance of the spring structure 82. When the master pump valve is closed, the spring structure inhibits chemicals within the flow lines 36 from dripping or draining through the nozzle 28.

Figure 5:
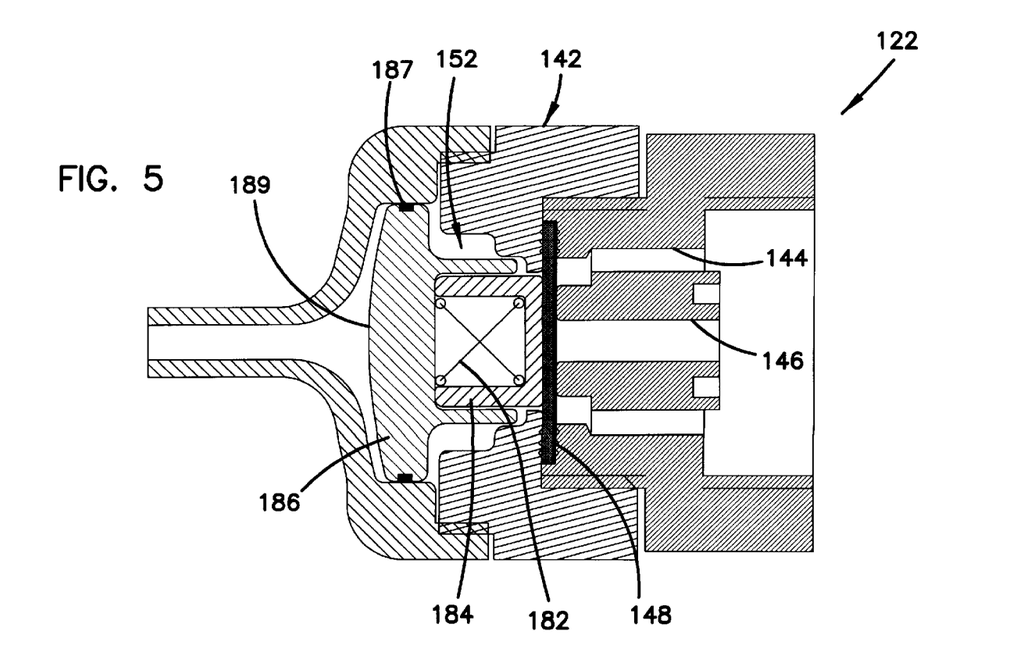
FIG. 5 is a cross-sectional view of a first alternate embodiment constructed in accordance with the principles of the present invention.

FIG. 5 is a cross-sectional view taken lengthwise through a first alternate valve 122 constructed in accordance with the principles of the present invention. As is apparent from FIG. 5, the valve 122 has many of the same components described with respect to the valve 22 of FIGS. 2–4. For example, the valve 122 includes a valve body 142 defining an inlet port 144 and an outlet port 146. The valve 122 also includes a first diaphragm 148 that functions as a sealing element for opening and closing a fluid flow path between the inlet and outlet ports 144 and 146. The valve 122 additionally includes a spring structure 182 for biasing the diaphragm 148 toward a closed position. The spring structure 182 is captured between first and second end caps 184 and 186.

The second end cap 186 includes a circumferential seal or surface 187 forming a fluid tight seal with the interior of the valve body 142. The second end cap 186 cooperates with the first diaphragm 148 to seal or enclose a chamber 152. When an actuation pressure is applied to an exterior side 189 of the second end cap 186, the second end cap 186 functions as a piston and moves toward the first diaphragm 148. As the second end cap 186 moves toward the first diaphragm 148, it engages the first end cap to mechanically cause the first diaphragm 148 to close the fluid flow path through the valve 122.

Figure 6:
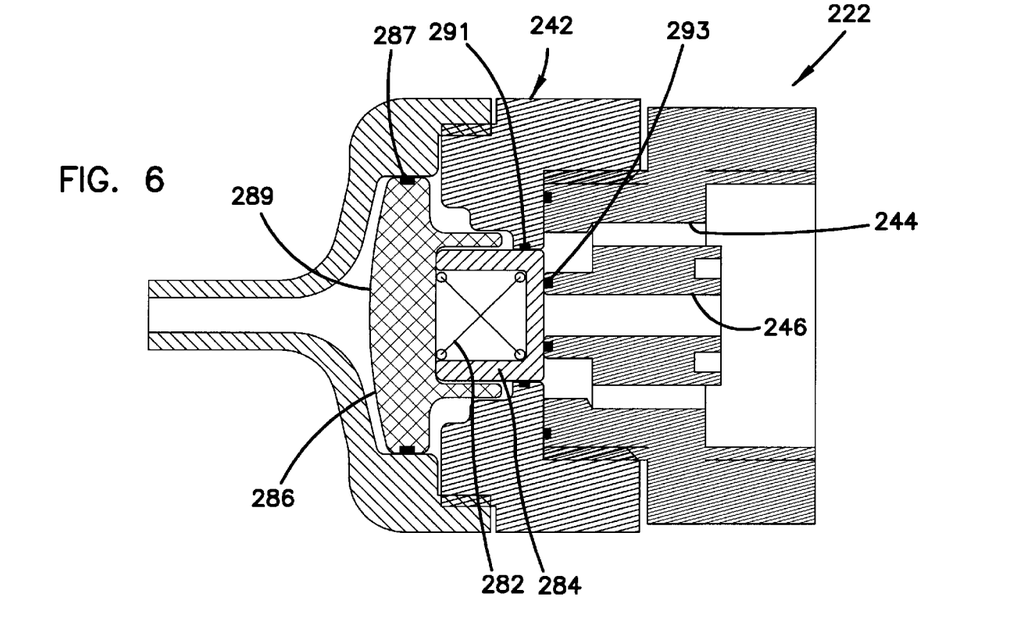
FIG. 6 is a cross-sectional view of a second alternate embodiment constructed in accordance with the principles of the present invention.

FIG. 6 is a cross-sectional view taken lengthwise through a second alternate valve 222 constructed in accordance with the principles of the present invention. As is apparent from FIG. 6, the valve 222 has many of the same components described with respect to the valve 22 of FIGS. 2–4. For example, the valve 222 includes a valve body 242 defining an inlet port 244 and an outlet port 246. The valve 222 additionally includes a spring structure 282 captured between first and second end caps 284 and 286.

The second end cap 286 includes a circumferential seal or surface 287 forming a fluid tight seal with the interior of the valve body 242. A circumferential seal 291 or O-ring also forms a seal between the first end cap 284 and the interior on the valve body 242. When an actuation pressure is applied to an exterior side 289 of the second end cap 286, the second end cap 286 functions as a piston and pushes the first end cap 284 toward the inlet and outlet ports 244 and 246.

The first end cap 284 is pushed axially against an O-ring 293 such that the valve is closed. In this manner, the first end cap 284 functions as a sealing element.

Thus, with regard to the foregoing description, it is to be understood that changes may be made in detail, especially in matters of the shape, size, and arrangement of the parts without departing from the scope of the present invention. It is intended that the specification and depicted embodiment be considered exemplary only, with a true scope and spirit of the invention being indicated by the broad meaning of the following claims.

We claim:

1. A valve comprising:
   a valve body defining an inlet port and an outlet port;
   a first diaphragm arranged and configured for opening and closing a fluid flow path between the inlet and outlet ports;
   a second diaphragm cooperating with the first diaphragm to enclose a chamber formed within the valve body;
   a piston positioned within the chamber between the first and second diaphragms, the piston including separate first and second piston pieces, the first piston piece engaging the first diaphragm and the second piston piece engaging the second diaphragm, wherein when an actuating pressure is applied to an exterior side of the second diaphragm, the piston causes the first diaphragm to close the fluid flow path between the inlet and outlet ports.

2. The valve of claim 1, wherein the valve body includes a first end piece, a second end piece and an intermediate piece positioned between the first and second end pieces.

3. The valve of claim 2, wherein the first end piece, the second end piece and the intermediate piece are threaded together.

4. The valve of claim 2, wherein the first diaphragm is positioned between the first end piece and the intermediate piece, and the second diaphragm is positioned between the second end piece and the intermediate piece.

5. The valve of claim 4, wherein the intermediate piece defines the chamber, and opposite ends of the chamber are enclosed and sealed by the first and second diaphragms.

6. The valve of claim 5, wherein the first end piece defines the inlet and outlet ports, and the second end piece is adapted for connection to a source of pneumatic pressure for supplying the actuating pressure to the second diaphragm.

7. The valve of claim 6, wherein the outlet port comprises a centrally located first axial opening defined by the first end piece, and the inlet port comprises at least one second axial opening defined by the first end piece that is radially offset from the first axial opening.

8. The valve of claim 1, wherein the first and second diaphragms are generally co-axially aligned.

9. The valve of claim 1, further comprising a spring structure positioned between the first and second piston pieces for biasing the first diaphragm toward a position in which the fluid flow path between the inlet and outlet ports is closed.

10. The valve of claim 9, wherein the first and second piston pieces comprise first and second end caps.

11. The valve of claim 10, wherein the spring structure comprises a coil spring having one end mounted in the first end cap and the other end mounted in the second end cap.

12. The valve of claim 11, wherein the first end cap engages the second end cap when fluid flow path is closed.

13. The valve of claim 1, wherein the first and second piston pieces are coaxially aligned.

14. The valve of claim 1, wherein the first piston piece engages the first diaphragm, and the second piston piece engages the second diaphragm.

15. The valve of claim 14, further comprising a resilient structure positioned between the first and second piston pieces.

16. The valve of claim 15, wherein the resilient structure is a coil spring.

17. The valve of claim 1, wherein the first piston piece includes a first end surface that engages the first diaphragm, wherein the second piston piece includes a second end surface that engages the second diaphragm, and wherein the second end surface has a larger area than the first end surface.

18. The valve of claim 1, wherein the chamber is not vented to atmosphere.

19. A valve adapted to be actuated by a source of fluid pressure, the valve comprising:
   a valve body defining an inlet port and an outlet port;
   a sealing element moveable between a first position in which a fluid flow path between the inlet and outlet ports is open, and a second position in which the fluid flow path between the inlet and outlet ports is closed;
   a first valve closing structure arranged and configured to move the sealing element to the second position when an actuating pressure is supplied to the first valve closing structure by the source of fluid pressure; and
   a second valve closing structure arranged and configured to resiliently bias the sealing element toward the second position.

20. The valve of claim 19, wherein the sealing element comprises a first diaphragm.

21. The valve of claim 20, wherein the first valve closing structure includes a second diaphragm.

22. The valve of claim 20, wherein the first valve closing structure includes a piston.

23. The valve of claim 19, wherein the second valve closing structure includes a spring structure.

24. The valve of claim 20, wherein the spring structure comprises a coil spring.

25. The valve of claim 19, wherein the first valve closing structure includes a piston having oppositely disposed first and second end portions, the first end portion engaging the sealing element and the second end portion being positioned to receive an actuating force generated by the actuating pressure, and wherein the second valve closing structure includes a spring structure biased against the piston that biases the sealing element toward the second position.

26. The valve of claim 25, wherein the piston includes first and second separate piston pieces, and the spring structure is positioned between the two separate piston pieces.

27. The valve of claim 23, wherein the spring structure generates a sealing pressure of about 5 pounds per square inch.

28. A valve comprising:
   a valve body defining an inlet port and an outlet port;
   a sealing element moveable between a first position in which a fluid flow path between the inlet and outlet ports is open, and a second position in which the fluid flow path between the inlet and outlet ports is closed;

means for pneumatically moving the sealing element to the second position; and means for resiliently biasing the sealing element toward the second position.

29. A valve comprising:

a valve body defining an inlet port and an outlet port;

a first diaphragm arranged and configured for opening and closing a fluid flow path between the inlet and outlet ports;

a second diaphragm cooperating with the first diaphragm to enclose a chamber formed within the valve body;

a piston positioned within the chamber between the first and second diaphragms, the piston including a first end surface and a second end surface, the second end surface having a larger area than the first end surface, the first end surface engaging the first diaphragm and the second end surface engaging the second diaphragm, wherein when an actuating pressure is applied to an exterior side of the second diaphragm, the piston causes the first diaphragm to close the fluid flow path between the inlet and outlet ports.

30. A valve comprising:

a valve body defining an inlet port and an outlet port;

a first diaphragm arranged and configured for opening and closing a fluid flow path between the inlet and outlet ports;

a second diaphragm cooperating with the first diaphragm to enclose a chamber formed within the valve body, the chamber being sealed with respect to atmosphere such that the chamber is not vented to atmosphere; and a piston positioned within the chamber between the first and second diaphragms, the first piston including a first end that engages the first diaphragm and a second end that engages the second diaphragm, wherein when an actuating pressure is applied to an exterior side of the second diaphragm, the piston causes the first diaphragm to close the fluid flow path between the inlet and outlet ports.

31. A valve comprising:

a valve body defining an inlet port and an outlet port, the valve body also at least partially defining a chamber that is not vented to atmosphere;

means for sealing the chamber;

a sealing element for opening and closing a fluid flow path between the inlet and outlet ports, the sealing element being moveable between an open orientation and a closed orientation; and a piston positioned at least partially within the chamber for moving the sealing element from the open position to the closed position.

* * * * *